US012779258B2

(12) United States Patent
Squire

(10) Patent No.: US 12,779,258 B2
(45) Date of Patent: Nov. 3, 2026

(54) SAFETY LINE APPARATUS

(71) Applicant: Latchways Plc, Devizes (GB)

(72) Inventor: Jacob Thackeray Squire, Devizes (GB)

(73) Assignee: MSA Technology, LLC, Cranberry Township, PA (US)

( * ) Notice: Subject to any disclaimer, the term of this patent is extended or adjusted under 35 U.S.C. 154(b) by 1063 days.

(21) Appl. No.: 17/442,447

(22) PCT Filed: Mar. 17, 2020

(86) PCT No.: PCT/GB2020/050673
§ 371 (c)(1),
(2) Date: Sep. 23, 2021

(87) PCT Pub. No.: WO2020/193947
PCT Pub. Date: Oct. 1, 2020

(65) Prior Publication Data

US 2022/0152436 A1 May 19, 2022

(30) Foreign Application Priority Data

Mar. 26, 2019 (GB) ..................................... 1904152

(51) Int. Cl.
*A62B 35/00* (2006.01)
*A62B 1/14* (2006.01)

(52) U.S. Cl.
CPC ............ *A62B 35/0081* (2013.01); *A62B 1/14* (2013.01); *A62B 35/0056* (2013.01)

(58) Field of Classification Search
CPC ... A62B 35/0081; A62B 1/14; A62B 35/0056; A62B 35/0087
See application file for complete search history.

(56) References Cited

U.S. PATENT DOCUMENTS

| | | | | | |
|---|---|---|---|---|---|
| 4,059,871 | A | * | 11/1977 | Swager | E06C 7/186 182/8 |
| 4,721,182 | A | * | 1/1988 | Brinkmann | A62B 35/0081 182/36 |
| 5,636,704 | A | * | 6/1997 | Castaneda | E04G 21/3295 182/5 |
| 5,924,522 | A | | 7/1999 | Ostrobrod | |

(Continued)

FOREIGN PATENT DOCUMENTS

| | | | |
|---|---|---|---|
| CH | 704409 A1 | 7/2012 | |
| CN | 2691642 Y | 4/2005 | |

(Continued)

*Primary Examiner* — Kimberly T Wood
(74) *Attorney, Agent, or Firm* — Jones Day

(57) ABSTRACT

A safety line traveller (1) for a fall protection system has a first component (2) in sliding engagement with a safety line (40), and a second component (3) which hinders sliding contact of the traveller with the safety line (40). The first and second components (2,3) are normally held in a sliding configuration in which the second component (3) is spaced from the safety line (40) and the first component (2) provides sliding contact with the safety line. The first and second components (2,3) are reconfigurable to an alternative configuration in which the second component (3) engages with the safety line (40) in order to hinder sliding of the traveller (1) on the safety line (40).

20 Claims, 6 Drawing Sheets

(56) References Cited

U.S. PATENT DOCUMENTS

| | | | | |
|---|---|---|---|---|
| 6,009,977 | A | 1/2000 | Pelofi | |
| 6,019,195 | A | 2/2000 | Pelofi | |
| 6,155,384 | A | 12/2000 | Paglioli | |
| 6,474,442 | B1 | 11/2002 | Atkinson et al. | |
| 9,186,530 | B2 | 11/2015 | Jones et al. | |
| 10,953,247 | B2 | 3/2021 | Muessig | |
| 2002/0050421 | A1 | 5/2002 | Lara | |
| 2003/0029672 | A1 * | 2/2003 | Argoud | A62B 35/0056 182/36 |
| 2003/0217887 | A1 | 11/2003 | Thomas et al. | |
| 2004/0020727 | A1 | 2/2004 | Petzl et al. | |
| 2004/0129494 | A1 | 7/2004 | Cherpitel | |
| 2005/0269160 | A1 | 12/2005 | Flux | |
| 2006/0054386 | A1 | 3/2006 | Blackford et al. | |
| 2007/0119653 | A1 | 5/2007 | Brown et al. | |
| 2007/0261915 | A1 * | 11/2007 | Auston | A62B 35/0087 182/11 |
| 2010/0294590 | A1 | 11/2010 | Bodnar et al. | |
| 2010/0300809 | A1 | 12/2010 | Miceli | |
| 2011/0073408 | A1 | 3/2011 | Vetesnik | |
| 2011/0186382 | A1 | 8/2011 | Sudale et al. | |
| 2011/0186388 | A1 | 8/2011 | Sudale et al. | |
| 2013/0256061 | A1 | 10/2013 | Codega et al. | |
| 2014/0020983 | A1 | 1/2014 | Casebolt et al. | |
| 2014/0196985 | A1 | 7/2014 | Moine et al. | |
| 2014/0196989 | A1 | 7/2014 | Moine et al. | |
| 2014/0284150 | A1 | 9/2014 | Chantelois et al. | |
| 2014/0311834 | A1 | 10/2014 | Lawton et al. | |
| 2015/0096152 | A1 | 4/2015 | Lefebvre et al. | |
| 2015/0114752 | A1 | 4/2015 | Bornack | |
| 2016/0001100 | A1 | 1/2016 | Hirst et al. | |
| 2016/0130875 | A1 | 5/2016 | Hwang | |
| 2017/0113072 | A1 | 4/2017 | Sepe | |
| 2019/0277088 | A1 | 9/2019 | Ostrobrod | |
| 2021/0101031 | A1 | 4/2021 | Bornack et al. | |

FOREIGN PATENT DOCUMENTS

| | | | | | |
|---|---|---|---|---|---|
| CN | 102274593 | A | | 12/2011 | |
| CN | 203208558 | U | | 9/2013 | |
| CN | 208626458 | U | | 3/2019 | |
| CN | 111111030 | A | | 5/2020 | |
| DE | 29717190 | U1 | | 2/1998 | |
| DE | 10224681 | A1 | | 12/2003 | |
| DE | 10334281 | B3 | | 5/2005 | |
| DE | 102004019714 | A1 | | 11/2005 | |
| DE | 202011002181 | U1 | * | 5/2011 | A62B 35/0081 |
| DE | 102010063285 | A1 | | 6/2011 | |
| DE | 102018103865 | A1 | | 9/2018 | |
| EP | 0279929 | A2 | | 8/1988 | |
| EP | 1522328 | A2 | | 4/2005 | |
| EP | 1820539 | A1 | | 8/2007 | |
| EP | 2011546 | A1 | | 1/2009 | |
| EP | 2095846 | A1 | | 9/2009 | |
| EP | 2527009 | A2 | | 11/2012 | |
| EP | 2581115 | A1 | | 4/2013 | |
| EP | 2641635 | A2 | | 9/2013 | |
| EP | 3603749 | A1 | | 2/2020 | |
| EP | 3626311 | A1 | | 3/2020 | |
| FR | 2879106 | A1 | | 6/2006 | |
| FR | 2898813 | A1 | | 9/2007 | |
| FR | 2903318 | A1 | | 1/2008 | |
| FR | 2954912 | A1 | | 7/2011 | |
| FR | 3066396 | A1 | | 11/2018 | |
| GB | 2338506 | A | * | 12/1999 | A62B 1/14 |
| GB | 2398822 | A | | 9/2004 | |
| GB | 2420820 | A | | 6/2006 | |
| GB | 2514155 | A | | 11/2014 | |
| GB | 2517675 | A | | 3/2015 | |
| GB | 2522721 | A | | 8/2015 | |
| GB | 2566574 | A | | 3/2019 | |
| IT | 102016000022849 | A1 | | 9/2017 | |
| JP | 2006255301 | A | | 9/2006 | |
| JP | 3128353 | U | | 1/2007 | |
| KR | 102084693 | B1 | | 3/2020 | |
| NL | 2017371 | B1 | | 3/2018 | |
| NL | 2017372 | B1 | | 3/2018 | |
| RU | 2004107292 | A | | 9/2005 | |
| WO | 2004075993 | A1 | | 9/2004 | |
| WO | WO-2005044383 | A1 | * | 5/2005 | A62B 1/14 |
| WO | WO-2005058422 | A1 | * | 6/2005 | A62B 35/0056 |
| WO | 2009037173 | A1 | | 3/2009 | |
| WO | 2009153147 | A1 | | 12/2009 | |
| WO | WO-2010012989 | A1 | * | 2/2010 | F16G 11/106 |
| WO | 2010149691 | A1 | | 12/2010 | |
| WO | 2011027109 | A1 | | 3/2011 | |
| WO | 2012164278 | A1 | | 12/2012 | |
| WO | 2012164279 | A2 | | 12/2012 | |
| WO | 2013053685 | A2 | | 4/2013 | |
| WO | 2013135929 | A1 | | 9/2013 | |
| WO | 2013164362 | A2 | | 11/2013 | |
| WO | 2014032745 | A2 | | 3/2014 | |
| WO | 2016093850 | A1 | | 6/2016 | |
| WO | 2016150703 | A1 | | 9/2016 | |
| WO | 2017030558 | A1 | | 2/2017 | |
| WO | 2017072667 | A1 | | 5/2017 | |
| WO | 2017164857 | A1 | | 9/2017 | |
| WO | 2017214699 | A1 | | 12/2017 | |
| WO | 2019149827 | A1 | | 8/2019 | |

* cited by examiner

SAFETY LINE APPARATUS

CROSS-REFERENCE TO RELATED APPLICATIONS

This application is the United States national phase of International Application No. PCT/GB2020/050673 filed Mar. 17, 2020, and claims priority to United Kingdom Patent Application Serial No. 1904152.4, filed Mar. 26, 2019, the disclosures of which are hereby incorporated by reference in their entirety.

BACKGROUND

Technical Field

This disclosure relates generally to a safety line apparatus, and more particularly to a safety line apparatus using a traveller that is arranged to be secured about and follow a safety line. The disclosure is particularly suited, but not limited to, use in horizontally orientated safety line equipment for use when working at height.

Technical Considerations

In height safety applications, such as, for example, working on a building roof, it is common for a safety apparatus to be provided that includes a horizontally orientated safety line to which an operative is secured using a harness connected tether. In order to move along the roof whilst connected to the horizontally orientated safety line, a traveller is provided for the tether, which permits the harness connected tether to move along the horizontally orientated safety line. Exemplary arrangements are disclosed, for example, in WO2011/027109 and GB2420820. Once secured to the safety line, the traveller cannot be removed without deliberate action to release the traveller by the operative.

A risk associated with a fall in such an environment is that if the operative falls over the edge of a building, the tether can slide against the building edge resulting in the edge cutting or sawing into the tether, with the associated risk of rupturing or snapping the tether and the operative falling to serious injury or death. Another risk occurs where two or more operatives are clipped to the same horizontal safety line and one is required to pass the other. This requires one of the operatives un-clipping their traveller and re-securing to the safety line when they have passed the other operative.

SUMMARY

Accordingly, provided is an improved safety line traveller arrangement.

In some non-limiting embodiments or aspects of the present disclosure, provided is a safety line traveller for a fall protection system that may include a first component arranged to provide sliding engagement with a safety line, and a second component arranged to hinder sliding contact of the traveller with the safety line, wherein the first and second components are normally held in a sliding configuration where the second component is spaced from the safety line and the first component provides sliding contact with the safety line but is reconfigurable to an alternative configuration in which the second component engages with the safety line in order to hinder sliding of the traveller on the safety line.

In some non-limiting embodiments or aspects, the first and second components may be caused to reconfigure from the sliding configuration to the alternate configuration in the event of a force acting on the traveller. In some non-limiting embodiments or aspects, the first and second components may be caused to reconfigure from the sliding configuration to the alternate configuration in the event of a restraining arrangement being overcome by a force acting on the traveller. In some non-limiting embodiments or aspects, the restraining arrangement may include a biasing arrangement biasing the components to the sliding configuration. In some non-limiting embodiments or aspects, the biasing arrangement may include one or more resilient biasing elements such as one or more spring elements.

In some non-limiting embodiments or aspects, the restraining arrangement may include a detent arrangement, which is released by a force acting on the traveller. In some non-limiting embodiments or aspects, the detent arrangement may include a breakable detent (such as a breakable pin), which breaks by a force acting on the traveller. In some non-limiting embodiments or aspects, the first and second components may move relative to one another translationally (linearly) between the sliding and alternate configurations.

In some non-limiting embodiments or aspects, a guide arrangement may be provided to guide the components to move between the sliding and alternate configurations. In some non-limiting embodiments or aspects, the guide arrangement may include a slot provided for one of the components and a slider structure carried by the other of the components for guided movement along the slot.

In some non-limiting embodiments or aspects, the first component may have a relatively smooth sliding surface and the second component may have a gripping surface and, before deployment from the first configuration to the alternate configuration, the gripping surface may be held spaced outwardly from the sliding surface. In some non-limiting embodiments or aspects, the first component may have an arcuate sliding surface. In some non-limiting embodiments or aspects, the second component may have an arcuate gripping surface.

In some non-limiting embodiments or aspects, the traveller may include a connection element for connection to a user. In some non-limiting embodiments or aspects, the second component may be provided with a connection element for connection to a user.

In some non-limiting embodiments or aspects, one of the first and second components may define an elongate slot extending in the intended direction of travel of the traveller. The elongate slot may be narrower than the width of the safety line to which the traveller is intended to be mounted. In some non-limiting embodiments or aspects, the component defining the elongate slot may have a curved structure tapering from a relatively broad root portion to a narrower tip portion, the tip portion defining an edge of the slot. In some non-limiting embodiments or aspects, one of the components may be mounted within the other of the components. One of the components may be mounted within the longitudinal extent of the other component such that it is bounded at either end by the other of the components.

In some non-limiting embodiments or aspects, a portion of one of the components may extend to project through an opening in the other of the components. In some non-limiting embodiments or aspects, the second component may be mounted within the first component. In some non-limiting embodiments or aspects, the first component may include a slider element and the second component comprises a brake element.

In some non-limiting embodiments or aspects, the shape and configuration of the traveller may be such that a nesting space is dimensioned to accommodate a like shaped and dimensioned traveller, in an inverted position, in the nesting space. In some non-limiting embodiments or aspects, the nesting space may enable an inverted traveller to pass through the nesting space in the direction of travel of the traveller. In some non-limiting embodiments or aspects, the nesting space may be defined by one of the first and second components which has a curved structure tapering from a relatively broad root portion to a narrower tip portion.

In some non-limiting embodiments or aspects, provided is a safety line traveller that may have a safety line encompassing structure which is shaped and configured such that a nesting space is dimensioned to accommodate a like shaped and dimensioned traveller, in an inverted position, in the nesting space. In some non-limiting embodiments or aspects, the nesting space may enable an inverted traveller to pass through the nesting space in the direction of travel of the traveller. In some non-limiting embodiments or aspects, the nesting space may be preferably defined by the safety line encompassing structure which has a curved structure tapering from a relatively broad root portion to a narrower tip portion.

Further non-limiting embodiments or aspects are described in one or more of the following numbered clauses.

Clause 1: A safety line traveller for a fall protection system comprising: a first component arranged to provide sliding engagement with a safety line, and a second component arranged to hinder sliding contact of the traveller with the safety line, wherein the first and second components are normally held in a sliding configuration where the second component is spaced from the safety line and the first component provides sliding contact with the safety line but reconfigurable to an alternative configuration in which the second component engages with the safety line in order to hinder sliding of the traveller on the safety line.

Clause 2: The safety line traveller according to clause 1, wherein the first and second components are caused to reconfigure from the sliding configuration to the alternate configuration in the event of a force acting on the traveller.

Clause 3: The safety line traveller according to clause 1 or 2, wherein the first and second components are caused to reconfigure from the sliding configuration to the alternate configuration in the event of a restraining arrangement being overcome by a force acting on the traveller.

Clause 4: The safety line traveller according to any of clauses 1-3, wherein the restraining arrangement comprises a biasing arrangement biasing the components to the sliding configuration.

Clause 5: The safety line traveller according to any of clauses 1-4, wherein the biasing arrangement comprises one or more resilient biasing elements such as one or more spring elements.

Clause 6: The safety line traveller according to any of clauses 1-5, wherein the restraining arrangement comprises a detent arrangement, which is released by a force acting on the traveller.

Clause 7: The safety line traveller according to any of clauses 1-6, wherein the detent arrangement comprises a breakable detent (such as a breakable pin) which breaks by a force acting on the traveller.

Clause 8: The safety line traveller according to any of clauses 1-7, wherein the first and second components move relative to one another translationally (linearly) between the sliding and alternate configurations.

Clause 9: The safety line traveller according to any of clauses 1-8, wherein a guide arrangement is provided to guide the components to move between the sliding and alternate configurations.

Clause 10: The safety line traveller according to any of clauses 1-9, wherein the guide arrangement comprises a slot provided for one of the components and a slider structure carried by the other of the components for guided movement along the slot.

Clause 11: The safety line traveller according to any of clauses 1-10, wherein the first component has a relatively smooth sliding surface and the second component has a gripping surface and before deployment from the first configuration to the alternate configuration, the gripping surface is held spaced outwardly from the sliding surface.

Clause 12: The safety line traveller according to any of clauses 1-11, wherein the first component has an arcuate sliding surface.

Clause 13: The safety line traveller according to any of clauses 1-12, wherein the second component has an arcuate gripping surface.

Clause 14: The safety line traveller according to any of clauses 1-13, wherein the traveller includes a connection element for connection to a user.

Clause 15: The safety line traveller according to any of clauses 1-14, wherein the second component is provided with a connection element for connection to a user.

Clause 16: The safety line traveller according to any of clauses 1-15, wherein one of the first and second components defines an elongate slot extending in the intended direction of travel of the traveller.

Clause 17: The safety line according to any of clauses 1-16, wherein the elongate slot is narrower than the width of the safety line to which the traveller is intended to be mounted.

Clause 18: The safety line according to any of clauses 1-17, wherein the component defining the elongate slot comprises a curved structure tapering from a relatively broad root portion to a narrower tip portion, the tip portion defining an edge of the slot.

Clause 19: The safety line traveller according to any of clauses 1-18, wherein one of the components is mounted within the other of the components.

Clause 20: The safety line traveller according to any of clauses 1-19, wherein one of the components is mounted within the longitudinal extent of the other component such that it is bounded at either end by the other of the components.

Clause 21: The safety line traveller according to any of clauses 1-20, wherein a portion of one of the components extends to project through an opening in the other of the components.

Clause 22: The safety line traveller according to any of clauses 1-21, wherein the second component is mounted within the first component.

Clause 23: The safety line traveller according to any of clauses 1-22, wherein the first component comprises a slider element and the second component comprises a brake element.

Clause 24: The safety line traveller according to any of clauses 1-23, wherein the shape and configuration of the traveller is such that a nesting space is dimensioned to accommodate a like shaped and dimensioned traveller, in an inverted position, in the nesting space.

Clause 25: The safety line traveller according to any of clauses 1-24, wherein the nesting space enables an inverted traveller to pass through the nesting space in the direction of travel of the traveller.

Clause 26: The safety line traveller according to any of clauses 1-25, wherein the nesting space is defined by one of the first and second components which has a curved structure tapering from a relatively broad root portion to a narrower tip portion.

Clause 27: A safety line traveller comprising a safety line encompassing structure which is shaped and configured such that a nesting space is dimensioned to accommodate a like shaped and dimensioned traveller, in an inverted position, in the nesting space.

Clause 28: The safety line traveller according to clause 27, wherein the nesting space enables an inverted traveller to pass through the nesting space in the direction of travel of the traveller.

Clause 29: The safety line traveller according to clause 27 or 28, wherein the nesting space is defined by the safety line encompassing structure which has a curved structure tapering from a relatively broad root portion to a narrower tip portion.

Clause 30: A safety line traveller for a fall protection system, the safety line traveller comprising: a slide element; and a brake element connected to the slide element and movable relative to the slide element between a first position and a second position in response to a force applied to the brake element, wherein, in the first position, the brake element is configured to be spaced apart from a safety line to permit a sliding movement of the slide element along the safety line, and wherein, in the second position, the brake element is configured to be engaged with the safety line to prevent the sliding movement of the slide element along the safety line.

Clause 31: The safety line traveller according to clause 30, wherein the brake element is biased to the first position by at least one biasing arrangement.

Clause 32: The safety line traveller according to clause 30 or 31, wherein the at least one biasing arrangement is a compression spring having a first end engaging a shoulder on the brake element and a recess on a base of the slide element.

Clause 33: The safety line traveller according to any of clauses 30-32, wherein the at least one biasing arrangement is a detent arrangement, which is released by the force acting on the brake element.

Clause 34: The safety line traveller according to any of clauses 30-33, wherein the brake element moves linearly relative to the slide element between the first position and the second position.

Clause 35: The safety line traveller according to any of clauses 30-34, wherein the brake element comprises a tongue that is movably received within a slot on the slide element.

Clause 36: The safety line traveller according to any of clauses 30-35, wherein the tongue has an aperture configured for connecting to a tether.

Clause 37: The safety line traveller according to any of clauses 30-36, wherein the tongue has an opening configured to receive a fixing connected to the slide element, and wherein the fixing delimits movement of the brake element between the first position and the second position.

Clause 38: The safety line traveller according to any of clauses 30-37, wherein the brake element further comprises an arcuate brake structure having a first end connected to the tongue and a second, free end.

Clause 39: The safety line traveller according to any of clauses 30-38, wherein the arcuate brake structure tapers in a direction from the first end toward the second end.

Clause 40: The safety line traveller according to any of clauses 30-39, wherein the arcuate brake structure has a gripping surface having one or more gripping projections configured for contacting the safety line when the brake element is in the second position.

Clause 41: The safety line traveller according to any of clauses 30-40, wherein the arcuate brake structure is received between a pair of arcuate slide structures extending from a base of the slide element.

Clause 42: The safety line traveller according to any of clauses 30-41, wherein each of the arcuate slide structures has a smooth sliding surface configured for contacting the safety line in the first position.

Clause 43: The safety line traveller according to any of clauses 30-42, wherein the arcuate slide structures are connected to each other by a bridge.

Clause 44: The safety line traveller according to any of clauses 30-43, wherein a slot is defined between a base of the slide element and a free end of each of the arcuate slide structures, and wherein the slot is narrower than a width of the safety line.

Clause 45: The safety line traveller according to any of clauses 30-44, wherein the brake element and the slide element define a nesting space configured to permit a passage of a second safety line traveller through the slot and the nesting space in a direction of travel along the safety line.

Clause 46: A safety line traveller for a fall protection system, the safety line traveller comprising: a slide element having a base and a pair of spaced apart arcuate slide structures connected to the base; and a brake element having a tongue extending through a slot in the base of the slide element and an arcuate brake structure connected to the tongue and positioned between the arcuate slide structures, wherein the brake element is movable relative to the slide element between a first position and a second position in response to a force applied to the tongue of the brake element, wherein, in the first position, the arcuate brake structure of the brake element is configured to be spaced apart from a safety line to permit a sliding movement of the arcuate slide structures of the slide element along the safety line, and wherein, in the second position, the arcuate brake structure of the brake element is configured to be engaged with the safety line to prevent the sliding movement of the arcuate slide structures of the slide element along the safety line.

Clause 47: The safety line traveller according to clause 46, wherein the brake element is biased to the first position by at least one biasing arrangement.

Clause 48: The safety line traveller according to clause 46 or 47, wherein the arcuate brake structure has a gripping surface having one or more gripping projections configured for contacting the safety line when the brake element is in the second position, and wherein each of the arcuate slide structures has a smooth sliding surface configured for contacting the safety line in the first position.

Clause 49: The safety line traveller according to any of clauses 46-48, wherein a slot is defined between the base of the slide element and a free end of each of the arcuate slide structures, and wherein the brake element and the slide element define a nesting space configured to permit a passage of a second safety line traveller through the slot and the nesting space in a direction of travel along the safety line.

These and other aspects of the present disclosure will be apparent from and elucidated with reference to, the embodiments described herein.

BRIEF DESCRIPTION OF THE DRAWINGS

Various non-limiting embodiments or aspects of the present disclosure will now be described, by way of example only, and with reference to the accompany drawings, in which.

DETAILED DESCRIPTION

Figure 1:
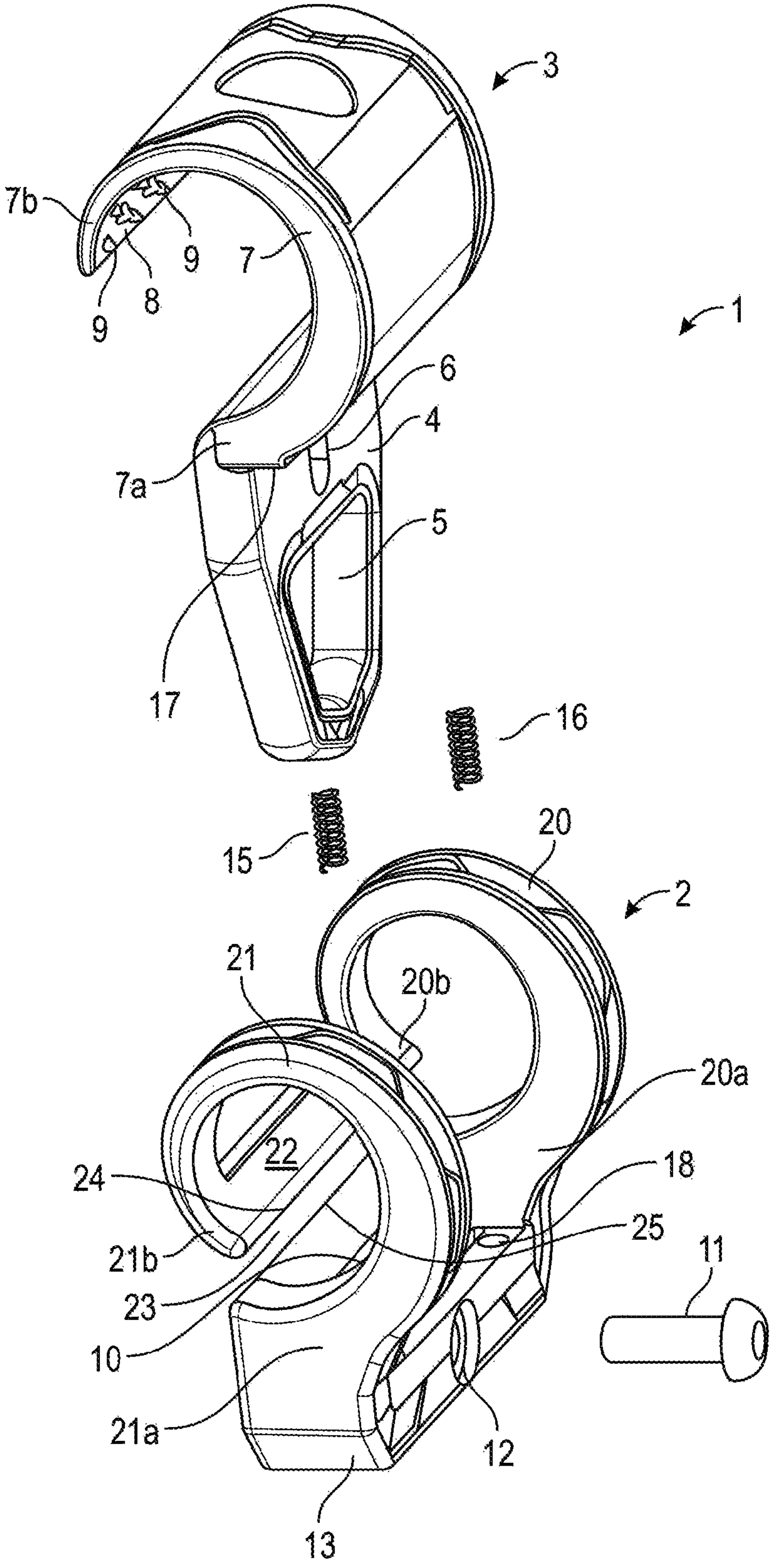
FIG. 1 is an exploded perspective view of a safety line traveller in accordance with some non-limiting embodiments or aspects of the present disclosure.
Figure 2:
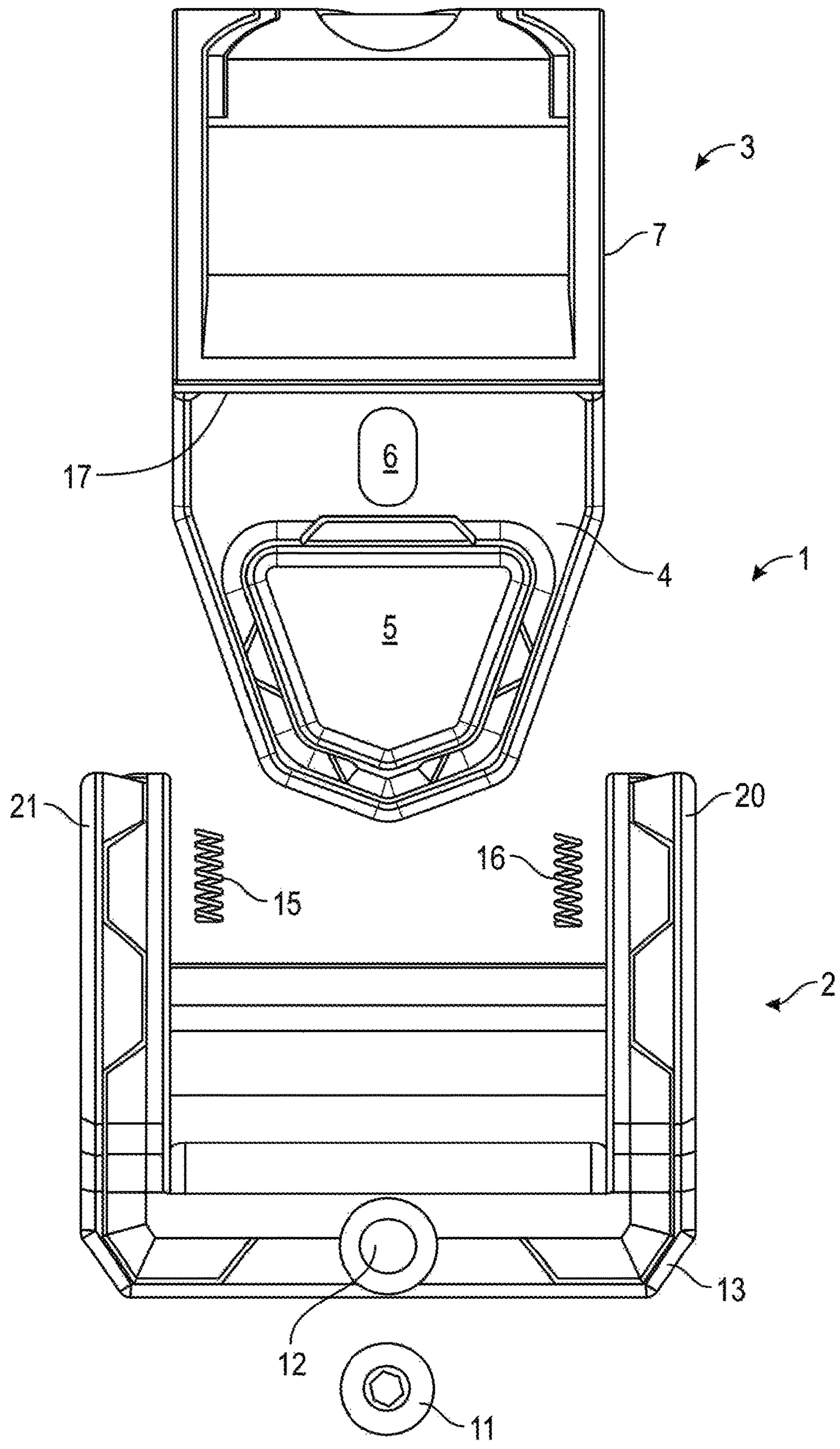
FIG. 2 is a side view of the safety line traveller shown in FIG. 1.

Referring to the drawings and according to some non-limiting embodiments or aspects, there is shown, in FIGS. 1 and 2, in exploded view, a safety line traveller 1 including a first component in the form of a slider element 2 and a second component in the form of a brake element 3. The brake element 3 includes a tongue 4 provided with an aperture 5 which acts as a connection element to an end of a tether (not shown) which is connected to a user's harness. The tongue 4 also is provided with an upwardly orientated slot 6. At the distal end of the tongue 4 is an arcuate structure 7 which tapers from a relatively broad root portion 7*a* to a relatively narrower tip portion 7*b*. The underside of the arcuate structure is provided with a roughened gripping surface 8 having gripping projections 9.

In some non-limiting embodiments or aspects, the tongue 4 of the brake element 3 projects through a slot 10 provided in a base structure 13 of the slider element 2. This is such that the user can clip their tether connector through the connection aperture 5 of the tongue 4 when the tongue 4 is projecting through the slot 10. A fixing 11 projects through a bore 12 provided in the base structure 13 and also passes through the upwardly elongate slot 6 provided in the brake element 3. This cooperation means that the brake element 3 can slide upwardly and downwardly (linearly) relative to the slider element 2 being guided by the fixing 11 sliding in the slot 6 and the tongue 4 sliding in the slot 10. In normal use, the brake element 3 is held to be biased upwardly (away from the base of the slider 2) by means of compression springs 15, 16 which act on shoulder 17 provided on the underside of the arcuate structure 7 of the brake element, and spring receiving recesses 18 provided on the base of the slider element 2. This ensures that the brake element 3 is normally biased away from the base of the slider element 2 so as to not contact the safety line during normal travel of the traveller 1 along the safety line. In this state the gripping projections 9 do not contact the safety line and are spaced away from internally facing surfaces of structures 20, 21 of the slider element 2, in order to facilitate sliding of the slider element on the safety line.

Figure 3:
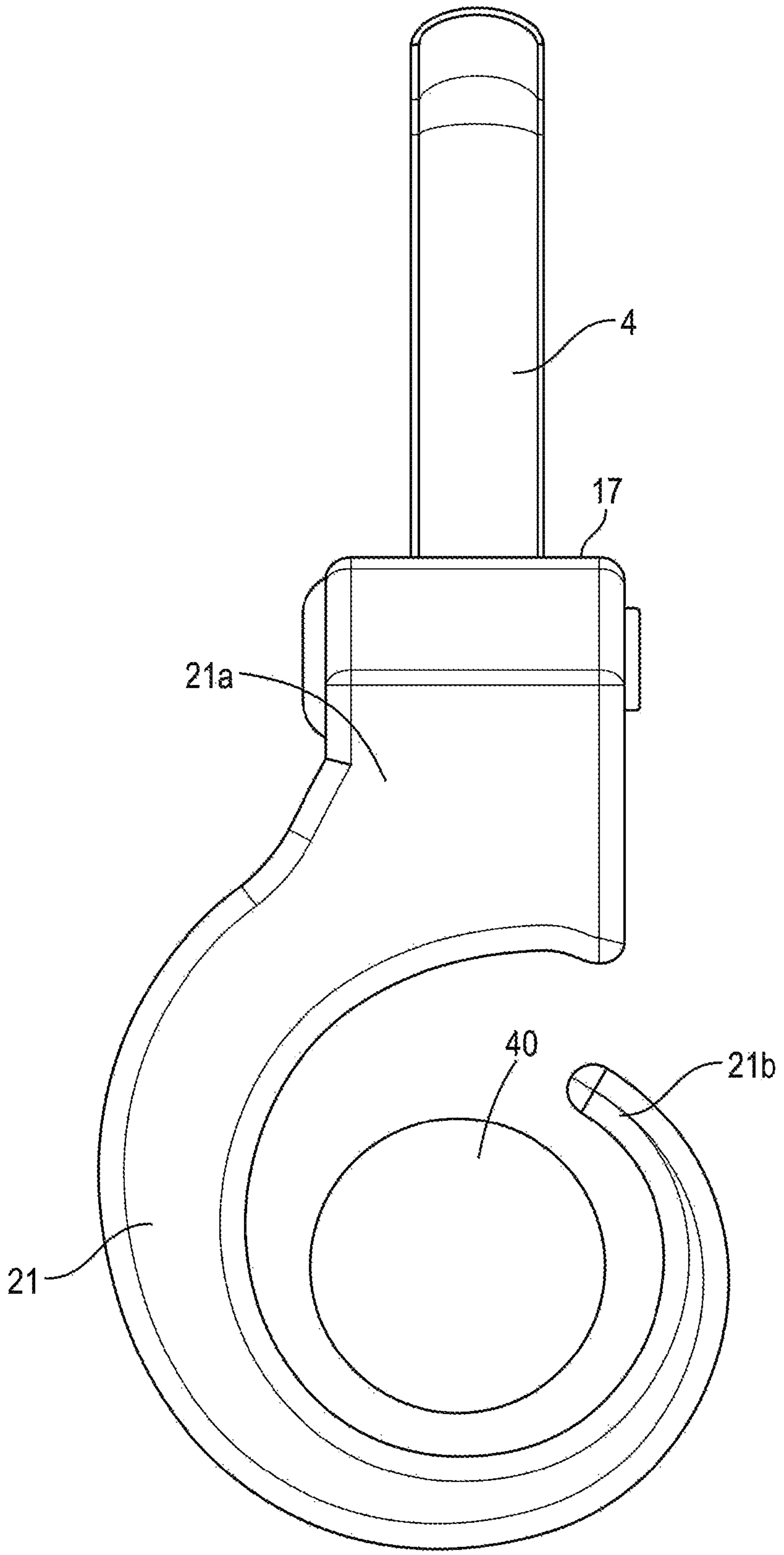
FIG. 3 is an end view of the safety line traveller of FIG. 1 mounted to a safety line.
Figure 4A:
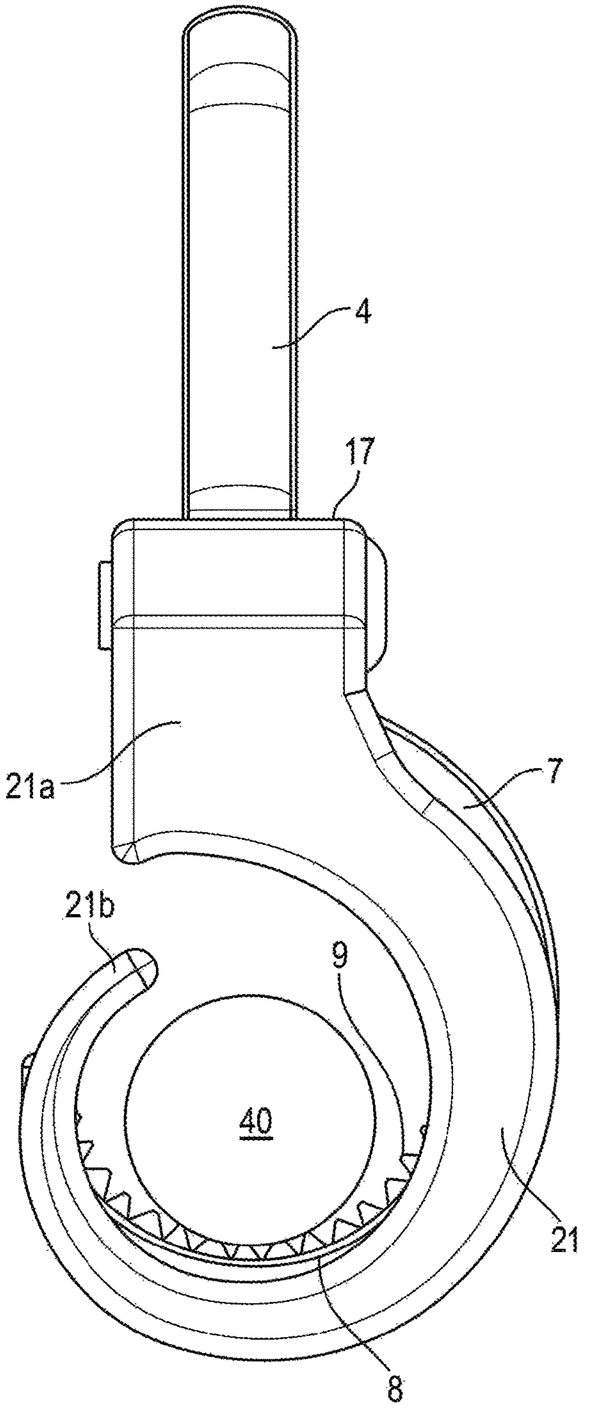
FIG. 4*a* is an end view of the safety line traveller of FIG. 1 mounted to a safety line and showing the traveller in a sliding configuration.
Figure 4B:
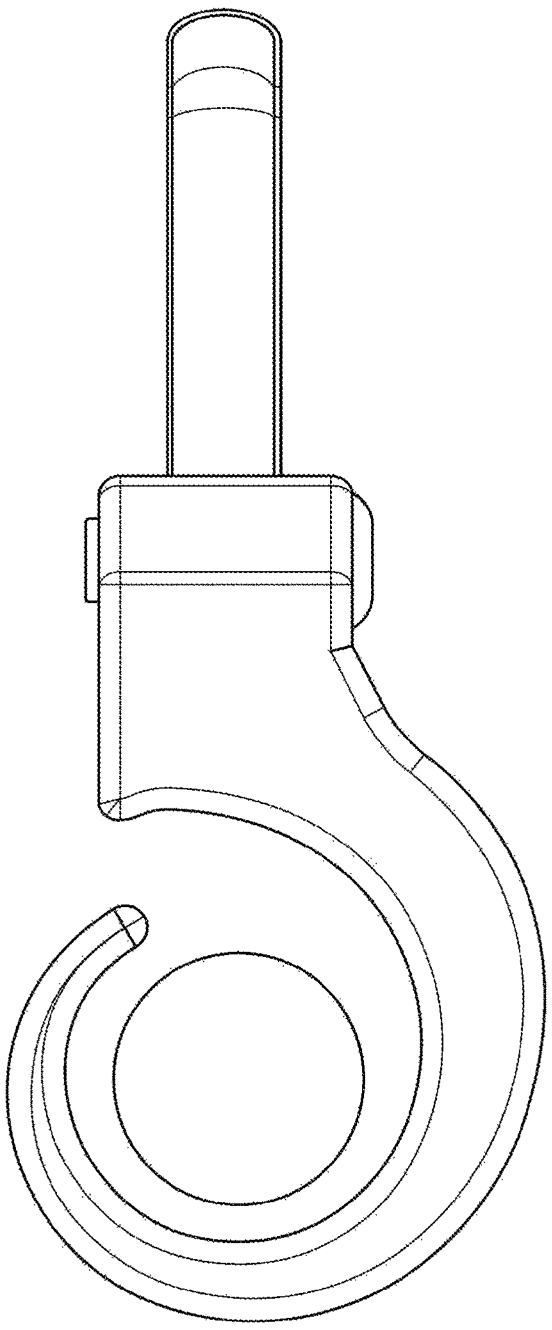
FIG. 4*b* is an end view of the safety line traveller of FIG. 1 mounted to a safety line and showing the traveller in a braking configuration.
Figure 5:
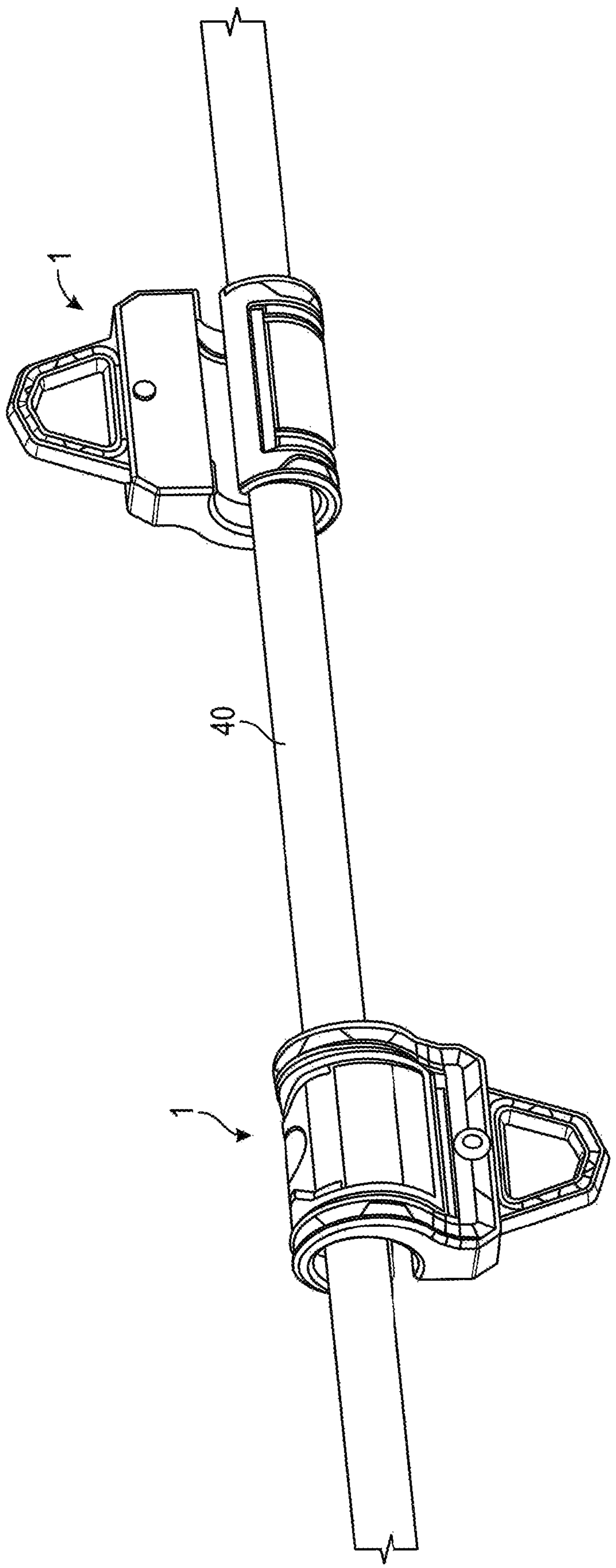
FIG. 5 is a perspective view of two identical safety line travelers mounted to the same horizontal safety line.

In some non-limiting embodiments or aspects, the arcuate structure 7 of the brake element 3 is mounted to be received within the longitudinal extent of the slider element 2 to be bounded at opposed ends (in the direction of travel of the traveller) by mirrored spaced arcuate structures 20, 21, each of which taper from a relatively broad root portion 20*a*, 21*a*, connected to the slider base 13, to a relatively narrower tip portion 20*b*, 21*b*. The internally facing surfaces of the structures 20, 21 are smooth to facilitate sliding of the slider element on the safety line. The tip portions 21*a*, 21*b* of the structures 20, 21 are connected by a bridge 22 which also defines an edge 24 of a slot 23. The other edge of the slot 23 is defined by an edge 25 of the slider element. The dimensions of the slot 23 are such that the slider cannot be pulled off the safety line i.e. the width of the slot is narrower than the dimeter of the safety line 40 (see for example FIG. 3).

In use, the user is tethered to the traveller 1 and is able to move along the surface of the building with the traveller sliding along safety line 40. In this situation the brake element 3 is biased out of contact of the safety line 40 by means of the normal action of the springs 15, 16. In the event of a fall, the user's tether will pull against the connection aperture 5 in the tongue 4 of the brake element 3 and a force will act against the springs 15, 16 thereby compressing the springs. In so doing, the gripping projections 9 on the underside of the arcuate structure 7 of the brake element 3 will engage with the safety line 40 and halt the travel of the traveller along the safety line 40. This prevents the users fall acting to carry the user in zip line fashion along the safety line 40 as it sags under his weight of the fall and inhibits the user from travelling over the edge of the building and risking the building edge sawing at the uses tether line. This avoids the deleterious consequences that could otherwise result from such action.

The embodiment described uses a set of biasing springs 15, 16 to hold the brake surface and gripping projections 9 away from engagement with the safety line 40 until deployed in to braking engagement as a result of a user falling. It will readily be appreciated by the skilled addressee that this could be accomplished by other means. For example, instead of the use of biasing springs, the brake element 3 could be held in the slide permitting configuration by a detent or other means which detent is overcome by the user's fall. For example, a breakable pin or detent could be used to hold the brake element 3 in the normal position (permitting sliding of the traveller 1) and the users falling could pull on the tongue 4 causing the detent force to be overcome (for example breaking a detent pin) and causing the brake element 3 to move to the braking configuration halting movement of the traveller 1 along the line 40.

Figure 6:
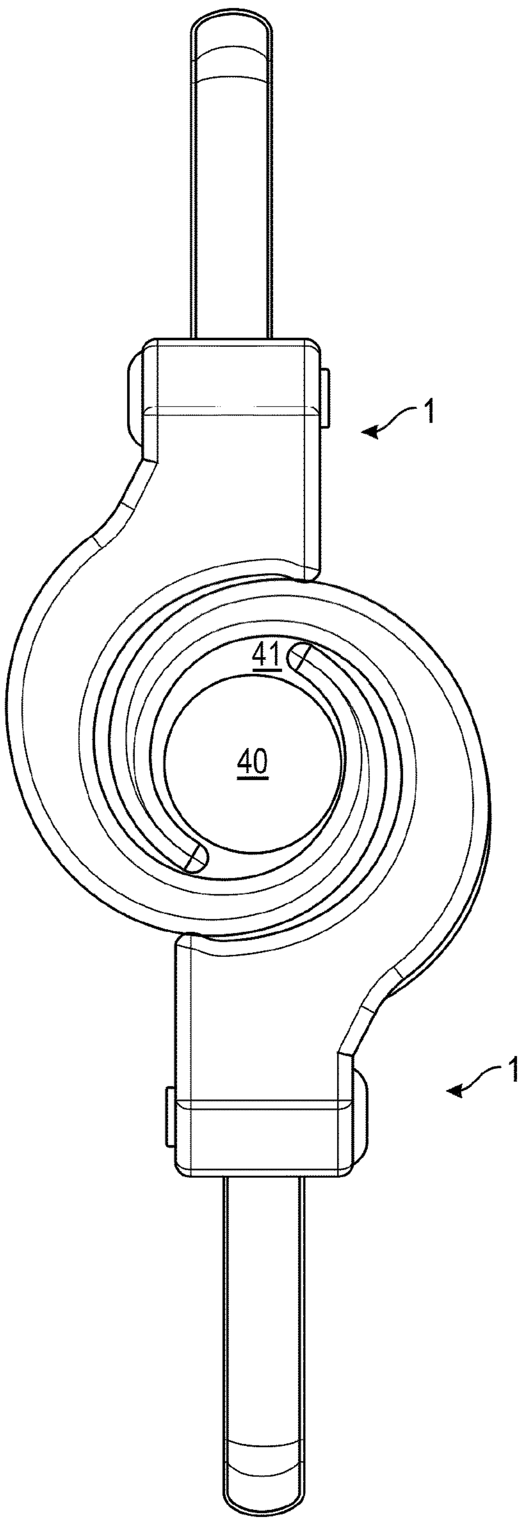
FIG. 6 is an end view of two identical safety line travelers mounted to the same horizontal safety line in a relationship orientation where they can by-pass one another on the safety line.

Another feature of the embodiments or aspects described herein is the facility to enable two like travellers to pass one another on the same safety line without the need to disengage either traveller from the safety line. This is achieved by virtue of the safety line traveller having a safety line encompassing structure which is shaped and configured such that a nesting space 41 is dimensioned to accommodate a like shaped and dimensioned traveller, in an inverted position, in the nesting space 41. This passing configuration is shown in FIG. 6. The nesting space 41 enables an inverted traveller to pass through the nesting space 41 in the direction of travel of the traveller. The nesting space 41 is defined by the safety line 40 encompassing structure which has a curved structure tapering from a relatively broad root portion to a narrower tip portion.

It should be noted that the above-mentioned non-limiting embodiments or aspects illustrate rather than limit the disclosure, and that those skilled in the art will be capable of designing many alternative embodiments or aspects without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. A safety line traveller for a fall protection system, the safety line traveller comprising:

- a slide element comprising two structures spaced apart from each other at opposing longitudinal ends of the slide element thereby forming a space; and
- a brake element connected to and received in the space between the two structures of the slide element and movable relative to the slide element between a first position and a second position in response to a force applied to the brake element, wherein the brake element has a connection element to connect a tether or a harness of a user, and wherein the brake element comprises a tongue with an opening configured to receive a fixing connected to the slide element, the fixing being configured to delimit movement of the brake element between the first position and the second position,
- wherein, in the first position, the brake element is configured to be spaced apart from a safety line to permit a sliding movement of the slide element along the safety line, the safety line being horizontally oriented,
- wherein, in the second position, the brake element is configured to be engaged with the safety line to prevent the sliding movement of the slide element along the safety line, and
- wherein the slide element and the brake element move relative to one another linearly in a direction perpendicular to a longitudinal axis of the safety line between the first and second positions.

2. The safety line traveller according to claim 1, wherein the tongue is movably receivable within a slot on the slide element.

3. The safety line traveller according to claim 2, wherein the connection element is an aperture of the tongue.

4. The safety line traveller according to claim 2, wherein the brake element further comprises an arcuate brake structure having a first end connected to the tongue and a second, free end.

5. The safety line traveller according to claim 4, wherein the arcuate brake structure tapers in a direction from the first end toward the second, free end.

6. The safety line traveller according to claim 4, wherein the arcuate brake structure has a gripping surface having one or more gripping projections configured for contacting the safety line when the brake element is in the second position.

7. The safety line traveller according to claim 4, wherein the two structures of the slide element are a pair of arcuate slide structures extending from a base of the slide element.

8. The safety line traveller according to claim 7, wherein each of the arcuate slide structures has a smooth sliding surface configured for contacting the safety line in the first position.

9. The safety line traveller according to claim 7, wherein the arcuate slide structures are connected to each other by a bridge.

10. The safety line traveller according to claim 7, wherein a slot is defined between the base of the slide element and a free end of each of the arcuate slide structures, and wherein the slot is narrower than a width of the safety line.

11. The safety line traveller according to claim 10, wherein the brake element and the slide element define a nesting space configured to permit a passage of a second safety line traveller through the nesting space in a direction of travel along the safety line.

12. The safety line traveller according to claim 1, wherein the arcuate brake structure has a gripping surface having one or more gripping projections configured for contacting the safety line when the brake element is in the second position, and wherein each of the arcuate slide structures has a smooth sliding surface configured for contacting the safety line in the first position.

13. A safety line traveller for a fall protection system, the safety line traveller comprising:

- a slide element having a base and a pair of spaced apart arcuate slide structures connected to the base; and
- a brake element having a tongue extending through a slot in the base of the slide element and an arcuate brake structure connected to the tongue and positioned between the arcuate slide structures, wherein the tongue has a connection element to connect a tether or a harness of a user,
- wherein the brake element is movable relative to the slide element in a direction substantially perpendicular to a direction of movement of the slide element between a first position and a second position in response to a force applied to the tongue of the brake element,
- wherein the tongue has an opening configured to receive a fixing connected to the slide element, and wherein the fixing delimits movement of the brake element between the first position and the second position,
- wherein, in the first position, the arcuate brake structure of the brake element is configured to be spaced apart from a safety line to permit a sliding movement of the arcuate slide structures of the slide element along the safety line, the safety line being horizontally oriented,
- wherein, in the second position, the arcuate brake structure of the brake element is configured to be engaged with the safety line to prevent the sliding movement of the arcuate slide structures of the slide element along the safety line, wherein the force is applied in the direction substantially perpendicular to the direction of movement of the slide element.

14. The safety line traveller according to claim 13, wherein the arcuate brake structure has a gripping surface having one or more gripping projections configured for contacting the safety line when the brake element is in the second position, and wherein each of the arcuate slide structures has a smooth sliding surface configured for contacting the safety line in the first position.

15. The safety line traveller of claim 13, wherein, in the second position, a roughened gripping surface of an underside of the arcuate brake structure of the brake element is configured to be engaged with the safety line to prevent the sliding movement of the arcuate slide structures of the slide element along the safety line.

16. A safety line traveller for a fall protection system, comprising:

a first component arranged to provide sliding engagement with a safety line, wherein the safety line is horizontally oriented; and a second component arranged to hinder sliding contact of the traveller with the safety line and comprising a connection element to connect a tether or a harness of a user, wherein the first and second components are normally held in a sliding configuration in which the second component is spaced from the safety line and the first component provides sliding contact with the safety line, wherein the first and second components are reconfigurable to an alternative configuration in which the second component engages with the safety line in order to hinder sliding of the traveller on the safety line, and wherein the first and second components move relative to one another linearly in a direction perpendicular to a longitudinal axis of the safety line between the sliding and alternative configurations, wherein the second component comprises a tongue that is movably receivable within a slot of the first component, and wherein the tongue has an opening configured to receive a fixing connected to the first component, and wherein the fixing delimits movement of the second component between the sliding configuration and the alternative configuration.

17. A safety line traveller for a fall protection system, the safety line traveller comprising:

a slide element comprising two structures spaced apart from each other at opposing longitudinal ends of the slide element thereby forming a space; and a brake element connected to and received in the space between the two structures of the slide element and movable relative to the slide element between a first position and a second position in response to a force applied to the brake element, wherein the brake element comprises a tongue that is movably receivable within a slot on the slide element, and wherein the tongue has an opening configured to receive a fixing connected to the slide element, and wherein the fixing delimits movement of the brake element between the first position and the second position, wherein, in the first position, the brake element is configured to be biased by at least one biasing arrangement, causing the brake element to be spaced apart from a safety line to permit a sliding movement of the slide element along the safety line, and wherein, in the second position, the brake element is configured to overcome the biasing arrangement in response to the force applied to the brake element, causing the brake element to be engaged with the safety line to prevent the sliding movement of the slide element along the safety line.

18. The safety line traveller according to claim 17, wherein the at least one biasing arrangement is a compression spring having a first end engaging a shoulder on the brake element and a recess on a base of the slide element.

19. The safety line traveller according to claim 17, wherein the at least one biasing arrangement is a detent arrangement, which is releasable by the force acting on the brake element.

20. The safety line traveller according to claim 17, wherein the force applied to the brake element proceeds from a tether connecting the braking element to a user.

* * * * *